UNITED STATES PATENT OFFICE.

EMILE DE MEULEMEESTER, OF BRUSSELS, BELGIUM, ASSIGNOR TO FORCE, SOCIÉTÉ ANONYME, OF ANTWERP, BELGIUM.

PREPARATION OF YEAST.

SPECIFICATION forming part of Letters Patent No. 717,519, dated December 30, 1902.

Application filed March 12, 1901. Serial No. 50,826. (No specimens.)

*To all whom it may concern:*

Be it known that I, EMILE DE MEULEMEESTER, a subject of the King of Belgium, and a resident of 62 Rue de Neuchatel, Brussels, Belgium, have invented a certain new and useful Improvement Relating to the Treatment of Yeast, of which the following is a specification.

When compressed yeast is mixed with a substance possessing the property of liquefying compressed yeast—such as gum-arabic, carbonate of soda, or chlorid of sodium—a quantity of the moisture contained in its cellules, composed in part of the protoplasm of the yeast, exudes through the pores of these cellules and liquefies the ingredient employed. The protoplasm, which was incapable of fermentation when it was within the cellules, becomes fermentable when it leaves these latter, and this change in condition must apparently be attributed to the action of the special diastase elaborated by the living cellules. The fermentation may be remarked in the mass shortly after the mixing takes place, and it increases greatly as the extraction progresses, and this process of extraction is practically complete. The resulting semiliquid mass contains the protoplasm in intimate mixture with the ingredient which has served for its extraction and also the exhausted cellules. If the ingredient employed is gum-arabic, for example, its presence even in considerable proportions in the liquid mass after the elimination of the residuary products hardly presents any inconvenience, except that it diminishes the purity and the fineness of taste of the protoplasm and also that a fresh expenditure of gum-arabic is necessitated for each operation. When, however, other ingredients, such as carbonate of soda or chlorid of sodium, are employed, their presence in considerable proportions in the liquid mass gives rise to reactions, which by reducing the value of the product form an obstacle to their employment.

The object of this invention is to obviate these defects, and it is based upon the following observation: When the fermentation set up by the means described above is well established, if there is added to the mass a fresh quantity of compressed yeast and if the whole is well mixed, the cellules of the added yeast also yield their protoplasm to the mass, the fermentation of which continues, and if from time to time fresh quantities of compressed yeast are added to the mass the same phenomenon is reproduced without the necessity for adding gum-arabic or other ingredient employed for the initial extraction. In operating in this manner at a suitable temperature of, say, 5° to 15° centigrade, practically speaking, only alcoholic fermentation is produced, while if the yeast is allowed to ferment by itself in the natural manner a considerable development of putrid acid and other ferments takes place.

The invention therefore consists in extracting in a cold state the protoplasm of yeast by mixing compressed yeast (or even liquid yeast) with a quantity of gum-arabic, chlorid of sodium, carbonate of soda, or other ingredient possessing the property of liquefying compressed yeast, then when the fermentation of the mass is well established in adding thereto from time to time fresh quantities of compressed yeast and mixing the whole intimately, but without any fresh addition of the ingredient employed for producing the liquefaction. Thus, for example, if to one hundred kilograms of compressed yeast there are added ten kilograms of gum-arabic in powder, mixing well together, after about four or five hours the liquid mass is in full fermentation, and if on the following day—say from twenty to twenty-four hours after—fifty kilograms of compressed yeast are added and intimately mixed with the mass from two to three hours later the entire mass returns to a liquid state and fermentation again takes place. If next day and the succeeding days similar quantities of compressed yeast are added under the same conditions, the same result is still obtained. This operation may be repeated for ten, fifteen, or twenty days and more until the moment of separation of the protoplasm from the residuary products.

It is obvious that this process presents the great advantage of considerably diminishing in the final mass the proportion of the ingredient employed for the initial extraction, and if ingredients are used the presence of which gives rise to prejudicial reactions their action may be rendered unobjectionable by a sufficient number of additions of yeast.

I do not claim as my present invention the use of either of the ingredients above mentioned for extracting the protoplasm of yeast; but What I do claim, and desire to secure by Letters Patent, is—

The improved continuous process for the extraction of the protoplasm of yeast consisting in suitably liquefying a mass of yeast in a cold state, allowing the fermentation of the mass to be well established, and adding thereto from time to time fresh quantities of yeast, each successive addition of yeast being effected after the fermentation of the mass is well established, substantially as hereinbefore described.

In witness whereof I have hereunto set my hand in presence of two witnesses.

EMILE DE MEULEMEESTER.

Witnesses:
J. S. KIRKPATRICK,
H. T. E. KIRKPATRICK.